United States Patent [19]

Murray

[11] 4,126,519

[45] Nov. 21, 1978

[54] APPARATUS AND METHOD FOR THERMAL TREATMENT OF ORGANIC CARBONACEOUS MATERIAL

[75] Inventor: Robert G. Murray, Palo Alto, Calif.

[73] Assignee: Edward Koppelman, Encino, Calif.

[21] Appl. No.: 832,363

[22] Filed: Sep. 12, 1977

[51] Int. Cl.² .................. C10B 1/08; C10B 7/10; C10B 47/20; C10L 5/00

[52] U.S. Cl. ................................. 201/32; 34/31; 34/33; 34/236; 44/1 F; 44/1 G; 44/10C; 44/13; 48/101; 48/210; 201/5; 201/20; 201/34; 201/35; 201/39; 201/44; 202/110; 202/118; 202/120; 202/128; 423/205; 423/208

[58] Field of Search .................. 201/5, 20, 34, 35, 32, 201/39, 44; 202/105, 106, 108, 121, 110, 118, 119, 120, 128, 129; 44/1 F, 1 G, 10 C, 13; 48/101, 210, 202; 34/31, 33, 201, 236; 423/205, 208

[56] References Cited

U.S. PATENT DOCUMENTS

| | | | |
|---|---|---|---|
| 1,813,575 | 7/1931 | Janecke et al. | 423/205 |
| 2,391,566 | 12/1945 | Goodell | 201/32 X |
| 2,893,922 | 7/1959 | Alspaugh | 202/128 X |
| 3,647,379 | 3/1972 | Wenzel et al. | 48/202 |
| 4,049,392 | 9/1977 | Furman | 44/13 X |

Primary Examiner—Joseph Scovronek
Attorney, Agent, or Firm—Harness, Dickey & Pierce

[57] ABSTRACT

An apparatus and method for performing a continuous thermal treatment of organic carbonaceous materials under controlled pressure in which the feed material is introduced into the system in the form of a slurry, and the level of liquid is maintained at a preselected operating level, serving as a gas-tight seal. The feed material is conveyed upwardly of the liquid operating level and is thereafter introduced into a reaction chamber in which it is heated to within a controlled elevated temperature range under controlled pressure in a manner to effect vaporization of at least a portion of the volatile substances therein, forming a gaseous phase composed of condensible and noncondensible vapors. The gaseous phase is withdrawn from the reaction chamber in a direction countercurrent to the travel of the feed material and in heat exchange relationship therewith, effecting condensation of the condensible phase and transport of the noncondensible phase, and is extracted from the system through a discharge port disposed above the liquid operating level. The thermally reacted product is cooled and transferred from the reaction chamber into a receiving chamber from which it is extracted continuously or intermittently.

22 Claims, 5 Drawing Figures

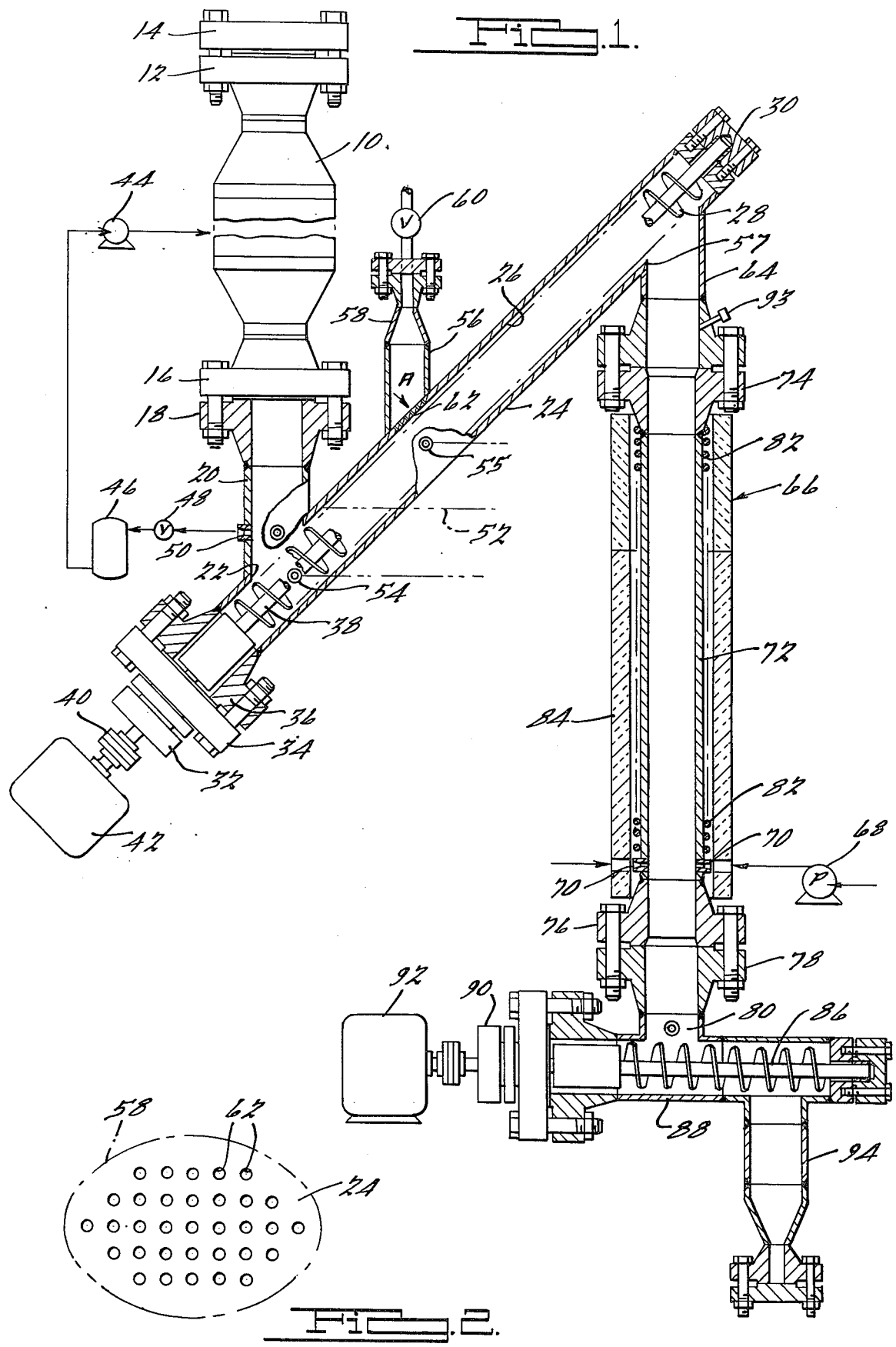

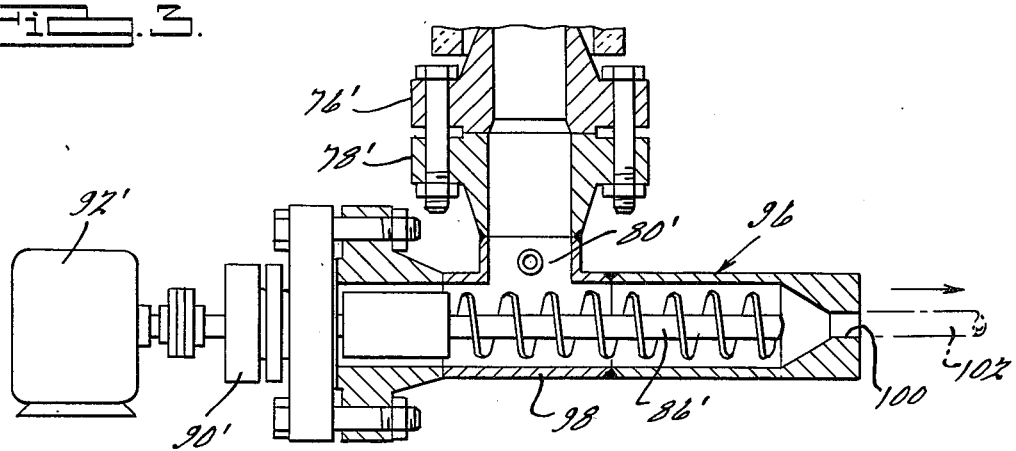
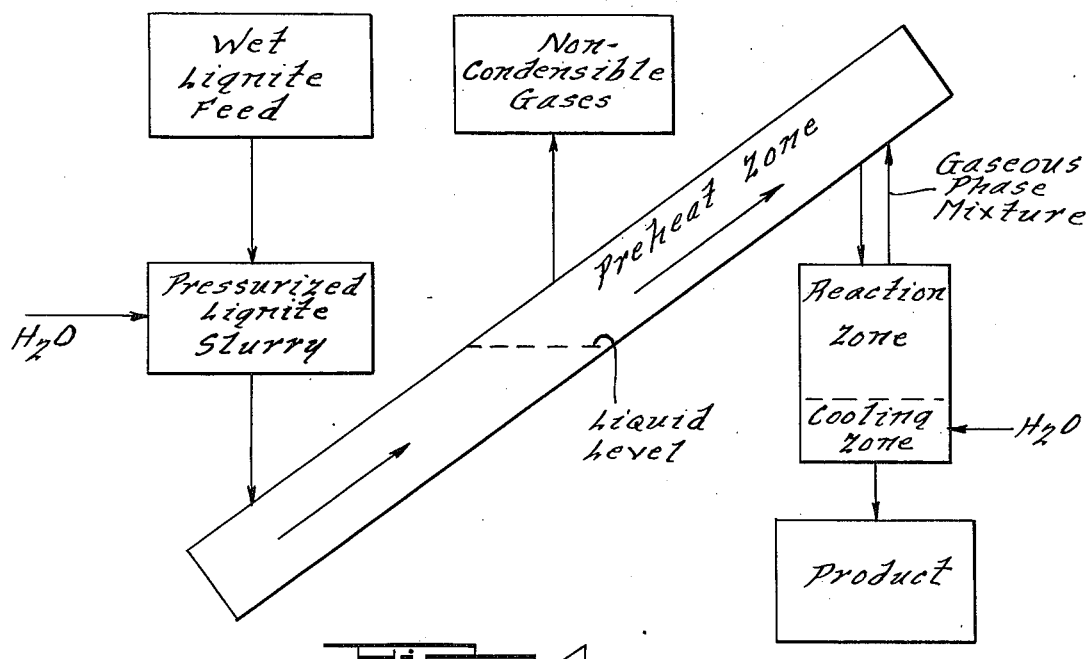

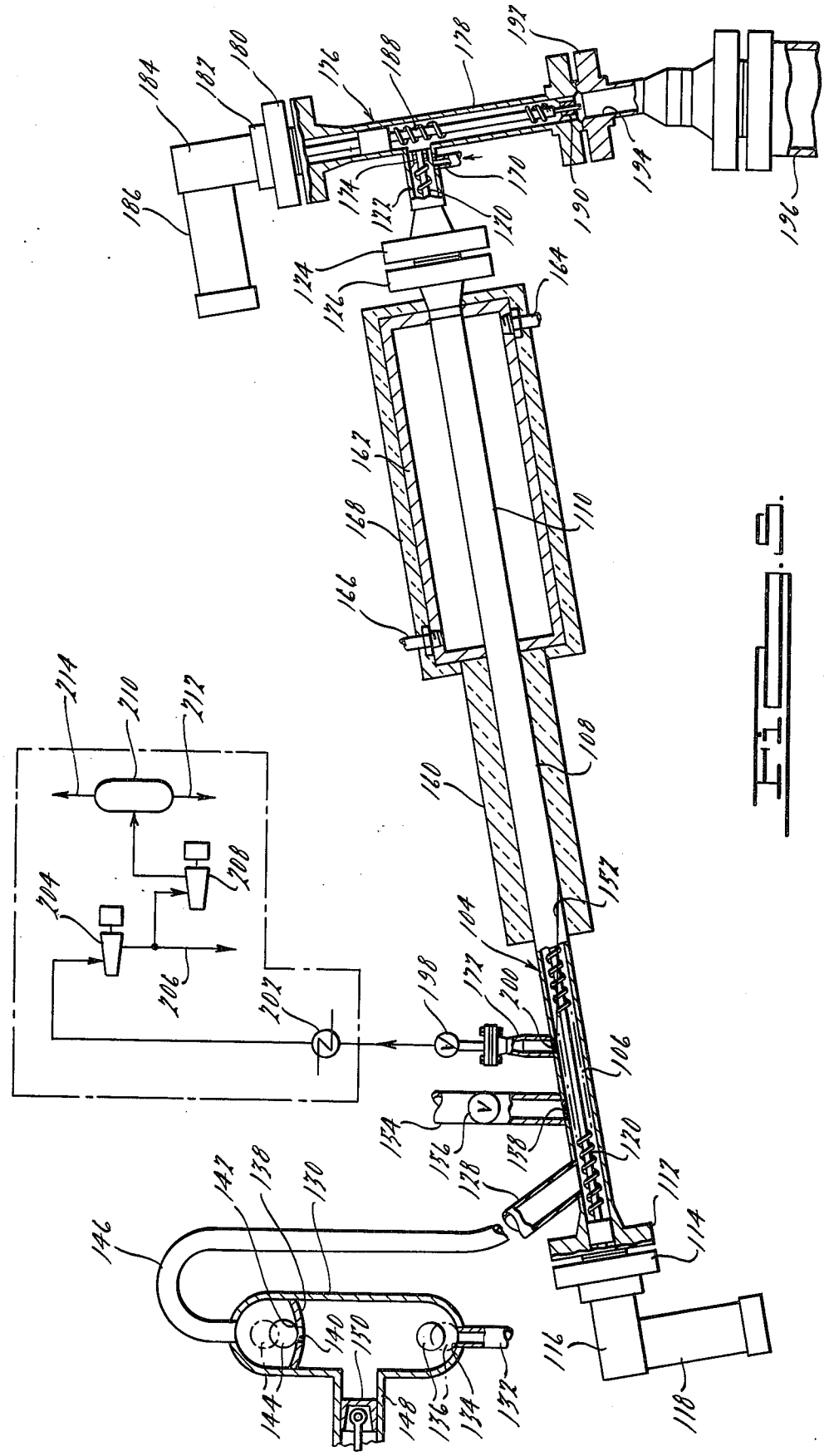

APPARATUS AND METHOD FOR THERMAL TREATMENT OF ORGANIC CARBONACEOUS MATERIAL

BACKGROUND OF THE INVENTION

The present invention is particularly applicable, but not necessarily restricted, to the processing of organic carbonaceous materials under pressure at elevated temperatures, whereby the energy introduced to effect a heating of the feed material and to effect the desired reaction is substantially recovered, providing for improved efficiency and economies in the practice of the process. Typical of processes to which the present invention is applicable is the drying of various naturally-occurring organic carbonaceous materials, such as peat, for example, to effect a removal of the predominant proportion of moisture therefrom; the thermal treatment of subbituminous coals, such as lignite, for example, to render it more suitable as a solid fuel; the production of activated chars or carbon products by subjecting organic carbonaceous materials to elevated pyrolysis temperatures, followed by an activation treatment; the pyrolysis of carbonaceous feed materials at elevated temperatures to effect a thermal cracking and/or degradation thereof into gaseous products producing a fuel gas; and the like. In each of the aforementioned processes, the feed material is heated to a controlled elevated temperature while in a controlled ambient environment for a period of time to achieve the desired thermal treatment. In the case of the upgrading of subbituminous coals, such as lignite, the heating is performed under controlled elevated pressures, whereby a controlled thermal restructuring of the lignitic structure is achieved in addition to the extraction of the predominant proportion of moisture therefrom.

Process equipment and processing techniques heretofore employed in the thermal treatment of organic carbonaceous feed materials have presented problems in the efficient utilization of energy introduced and/or evolved, the necessity of employing a plurality of interconnected units for performing the process steps requiring substantial capital expenditures for equipment and an inefficient use of plant space, the difficulty and complexity of controls necessary in many instances to enable operation of such processes on a continuous basis, the difficulties encountered in providing for an adequate seal of the equipment at the feed material entrance and product discharge and the general lack of flexibility and versatility of such equipment for adaptation to the processing of other materials at different temperatures and/or pressures.

The apparatus and process of the present invention overcomes many of the problems and disadvantages associated with prior art equipment and techniques by providing an integral process unit which is of simple design, of durable construction, which is versatile in use and can be readily adapted for processing different feed materials under different temperature and/or pressure conditions to produce different products. The apparatus of the present invention is further characterized as being of simple control and efficient in the utilization and recovery of heat energy, thereby providing for economical operation and a conservation of resources.

SUMMARY OF THE INVENTION

The benefits and advantages of the present invention in accordance with its apparatus aspects are achieved by a reaction system including a storage chamber to which a supply of particulated feed material to be processed is intermittently or continuously introduced and is admixed with a liquid so as to form a slurry or wet reaction mass. The use of a wet reaction mass is particularly advantageous in situations in which the thermal treatment is to be performed under high pressures, whereby pressurization of the material in the storage chamber is facilitated. The wet reaction mass or feed material is transferred from the storage chamber into a conveying chamber formed with an inlet at the lower end portion thereof and an outlet in the upper end portion thereof. The level of liquid in the conveying chamber is maintained at an appropriate operating level between the inlet and outlet ends of the chamber, with the lower portion thereof beneath the liquid level forming a gas-tight seal section, and with the upper portion thereof forming a liquid condensation chamber and drainage section for effecting a drainage of the feed material and a preheating thereof prior to discharge from the outlet.

A reaction chamber is disposed with its inlet end in communication with the outlet in the conveying chamber for receiving the preheated feed material and the feed material is further heated in the reaction chamber to the desired elevated temperature for a period of time sufficient to effect the desired thermal treatment thereof, including the volatilization of at least a portion of the volatile substances therein forming a gaseous phase composed of a condensible portion and a substantially noncondensible portion. The gaseous phase is continuously withdrawn from the reaction chamber in a direction countercurrent to the flow of feed material and in heat exchange contact therewith, effecting a progressive condensation of the condensible portion and a corresponding preheating of the feed material by the latent heat of vaporization recovered. The resultant condensed liquid is drained from the feed material and is admixed with the liquid in the lower portion of the conveying chamber. The remaining noncondensible gaseous portion is withdrawn through a gas outlet in the conveying chamber positioned upwardly of the liquid operating level and the outlet of the conveying chamber. The reaction product from the reaction chamber is cooled to recover a portion of the sensible heat therein by the volatilization of liquid coming in contact therewith, forming an additional condensible gaseous phase which passes in a countercurrent direction relative to the feed material. The cooled reaction product is transferred into a receiving chamber from which it is continuously or intermittently removed as may be desired.

In accordance with its process aspects, the present invention provides for a process in which a carbonaceous feed material in admixture with liquid is transferred upwardly through a conveying chamber having a predetermined operating level of liquid therein in a manner such that the material progressively drains of liquid as it moves upwardly in the conveying chamber and also is preheated by the condensation of condensible vapors thereon, as well as by contact with noncondensible gases at elevated temperatures. A further heating of the preheated feed material is effected in a thermal reaction chamber and the material is retained therein for a predetermined resident time to effect the desired reaction such as drying, thermal restructuring, pyrolization, and/or gasification, whereby vapors are evolved and are transferred in a countercurrent direction relative to the feed material and in heat exchange contact therewith. The resultant reaction product is continuously removed from the reaction chamber after being subjected to a cooling treatment by vaporization of liquid coming in contact therewith, forming a condensible phase which also is removed along with the gaseous phase generated in the reactor itself to effect a preheating of the incoming feed material. The resultant reaction product is introduced into a receiving chamber from which it is intermittently or continuously removed. In accordance with a preferred process embodiment, the reaction product is continuously removed by extrusion, under pressure, forming a solid product, as well as for providing a seal of the output end of the system.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a side elevational view, partly in section and partly schematic, illustrating a continuous reaction system constructed in accordance with the preferred embodiment of this invention;

FIG. 2 is an enlarged fragmentary plan view of the gas discharge port in the conveying chamber of the apparatus as viewed in the direction of the arrow indicated at A in FIG. 1;

FIG. 3 is a fragmentary side elevational view, partly in section and partly schematic, illustrating an alternative embodiment for effecting a continuous extraction of the thermal reaction product by extrusion;

FIG. 4 is a schematic flow diagram of the operating steps performed in the apparatus shown in FIG. 1 during the thermal processing of organic carbonaceous feed materials; and FIG. 5 is a side elevational view, partly in section and partly schematic, illustrating a continuous reaction system constructed in accordance with an alternative embodiment of this invention.

DESCRIPTION OF THE PREFERRED EMBODIMENTS

Referring now in detail to the drawings, and as may be best seen in FIG. 1, an apparatus for thermal processing of organic carbonaceous materials in accordance with the present invention comprises a storage hopper 10, which is adapted to be filled with a particulated carbonaceous feed material and is formed with a flanged upper inlet end 12, which is closed and sealed by a blind flange 14. The lower portion of the storage hopper 10 is mounted by a flange 16 in sealed supported relationship to a flange 18 connected to a pipe or conduit 20 defining an inlet 22 disposed in communication with the lower end portion of an angularly inclined vessel 24, defining a conveying chamber 26. The conveying chamber 26 is of a generally circular cross sectional configuration and is of the same diameter along the entire length thereof.

A screw-type conveyor or auger 28 extends for substantially the entire length of the conveying chamber and is rotatably supported at its upper end by an end cap 30 bolted to the upper end of the vessel 24 and at its lower end by means of a seal and bearing assembly 32 on a flange 34, securely bolted in sealed relationship to a flange 36 connected to the lower end of the vessel 24. The central shaft 38 of the screw conveyor 28 projects beyond the seal and bearing assembly 32 and is connected by means of a coupling 40 to a variable speed electric motor 42 for effecting rotation thereof at a controlable speed.

When the apparatus is operated under high pressure, the particulated feed material is introduced into the storage hopper 10 through one or a plurality of lock-hoppers (not shown) to avoid loss of internal pressure. When dual lock-hoppers are used, one lock-hopper is feeding the reactor, while the other lock-hopper is being recharged with feed material. The recharging cycle consists of: (1) isolating the first lock-hopper (which is now full of fluid but empty of particulate feed material) from the reactor by means of a valve; (2) reducing the fluid pressure to atmosphere in the empty lock-hopper; (3) filling the empty lock-hopper with particulate feed material which displaces the major part of the contained fluid; and (4) closing the pressure relief valve and increasing the fluid pressure to that of the reactor by pressure pump 44. Note that because the fluid is essentially incompressible, the work of increasing the system pressure is negligible.

In the specific embodiment illustrated in FIG. 1, the storage hopper 10 is adapted to be filled with a large charge of feed material which thereafter is sealed within the hopper by means of the flange 14. Because there is no isolating valve between the hopper and the reactor, the hopper pressure will be essentially equal to the reactor pressure. During operation, liquid can be injected into the feed hopper as particulate matter is removed, in order to keep the level of liquid in the conveying chamber 26 within the desired operating range. This is achieved by introducing liquid under a desired pressure by means of a liquid supply system schematically illustrated in FIG. 1, including a pressure pump 44, a storage or surge tank 46 and a flow control valve 48. The pump 44 is operated in conjunction with the flow control valve 48 connected to a coupling 50 in the pipe 20 so as to maintain the level of the liquid indicated at 52 in FIG. 1 within a preselected operating range. The operating level of the liquid 52 in the conveying chamber 26 can be automatically or visually monitored, such as by connecting a liquid level gauge (not shown) to a lower coupling or tap 54 and an upper coupling or tap 55 disposed in communication with the interior of the vessel 24, which enable a sensing of a minimum liquid level and maximum liquid level, respectively. The flow control valve 48 is operatable in response to fluctuations in the operating liquid level to maintain it substantially constant during operation.

The liquid introduced into the storage hopper 10 to effect a pressurization thereof and the formation of a liquid slurry with the particulated organic feed material therein usually consists of water but may comprise other liquids which are adapted to become vaporized and can be condensed under the pressure and temperature conditions prevailing in the apparatus. Ordinarily, organic feed materials of the type processed contain varying amounts of moisture therein and the use of water merely supplements the amount of water introduced by the feed material itself and also provides for excellent heat transfer between the feed material and resultant product, achieving optimum recovery of the heat introduced into the system. In the arrangement as illustrated in FIG. 1, the particulate carbonaceous feed material moves downwardly through the outlet of the storage hopper through the pipe 20 and inlet 22 into the lower portion of the conveying chamber at which it is engaged by and advanced upwardly by the screw-type conveyor 28. As the feed material advances beyond the operating level 52 of the liquid therein, a progressive drainage of the liquid from the feed material occurs and it becomes progressively drier on being advanced upwardly for discharge through an outlet 57 formed in the upper end thereof.

The vessel 24 is provided with a gas outlet 56 at a point intermediate the inlet and outlets thereof disposed at a position above the maximum liquid operating level in the conveying chamber. The gas outlet comprises a pipe 58 which is connected to a pressure flow control valve schematically indicated at 60 for exhausting noncondensible gases from the interior of the conveying chamber. Communication between the conveying chamber and the interior of the pipe 58 is provided by a plurality of perforations or ports 62, as best seen in FIG. 2, extending through the wall of the vessel in the region encompassed by the pipe 58.

The feed material, in addition to draining during its upward conveyance past the operating level 52 of liquid in the conveying chamber, is also preheated by the countercurrent flow of a gaseous phase entering the upper end of the conveying chamber through a flanged connector 64 secured to the upper end of a reactor 66. The gaseous phase is comprised of a substantially noncondensible portion comprising various organic volatile substances evolved during the heating of the carbonaceous material in the reactor, as well as a condensible phase comprising liquid, such as water, produced by a final drying of the carbonaceous material in the reactor, as well as that introduced through a pressure pump 68 into couplings 70 in the lower portion of the reactor for effecting a cooling of the carbonaceous reaction product. The temperature of the gaseous effluent from the reactor will vary in accordance with the particular temperature to which the carbonaceous feed material is heated in the reaction zone. The contact of the gaseous phase with the upwardly moving column of feed material causes a preheating thereof by the transfer of sensible heat from the noncondensible gaseous portion and a condensible gaseous portion, liberating its heat of vaporization to the incoming feed material. Accordingly, the gaseous phase discharged through the gas outlet 56 consists predominantly, if not entirely, of the noncondensible gaseous portion from which the predominant portion of sensible heat has been extracted, evidencing a substantially complete recovery of heat energy evolved in the thermal reactor in the form of a preheating of the incoming feed material.

It has also been discovered in accordance with the method aspects of the present invention that a further upgrading of the carbonaceous feed material is effected as a result of a removal of substantial amounts of alkali metal salts contained therein producing a low sodium or low potassium product. The particular mechanism by which this is achieved is not entirely understood at the present time, although it is believed to result from the condensation of steam on the cool incoming solids in the preheat section in the presence of a partial pressure of carbon dioxide forming carbonic acid. The carbon dioxide constituent is evolved from the carbonaceous feed materials in the hot reaction zone of the reactor and comprise a portion of the gaseous phase passing countercurrent through the preheat zone of the reactor. The carbonic acid aqueous solution accordingly contains hydrogen ions which undergo an ion exchange reaction with the alkali metals present in the feed material effecting an extraction or a leaching of at least a portion of such contaminating metal constituents.

In the specific situation of lignite beneficiation, for example, the carbonic acid solution contains hydrogen ions which are available for ion exchange reaction with the cations which exist in the carbonaceous solid feed. In general such cations as $K^+$ and $Na^+$ which contain a single positive charge are readily exchanged with the $H^+$ ion in the carbonic acid solution. Multiple valent cations such as $Ca^{++}$ or $Mg^{++}$ are less readily exchanged. Accordingly, in the case of lignite, the carbonic acid preferentially removes the sodium cations from the carbonaceous structure replacing them with hydrogen ions from the acid. In the case of cellulosic feed materials containing potassium, the potassium cation is the major constituent exchanged for the hydrogen ion from the acid. It will be understood that the foregoing theory is provided by way of possible explanation of the unexpected results obtained and does not constitute a part of the present invention.

The thermal reactor 66 comprises an upright tubular member 72 of a heat resistant substance or metal, such as a high temperature stainless steel alloy, for example, which is of substantially uniform diameter throughout its length and is connected, such as by welding, to an upper flange 74 to the flange connector 64 and by a lower flange 76 to a flange 78 secured to a receiving chamber 80. A heating of the tubular member 72 and the carbonaceous feed material traveling downwardly therethrough is achieved by an electrical resistance winding 82, over which a layer 84 of an insulation material is applied to minimize heat loss. As previously mentioned, the lower portion of the tubular member is provided with couplings 70, through which liquid is introduced via a pump 68 to effect a cooling of the reaction product by a conversion of the liquid to a condensible gaseous phase which travels upwardly in admixture with the other gaseous constituents formed in the reactor.

The movement of carbonaceous material downwardly through the reactor is achieved by gravity and is controlled by means of a screw conveyor 86 rotatably mounted within a tube 88 and drivingly coupled through a seal 90 to a variable speed electric motor 92. An increase or decrease of the speed of rotation of the screw conveyor 86 will correspondingly modify the residence time of the carbonaceous material within the hot zone of the reactor and is correlated with the speed of rotation of the motor 42 connected to the screw conveyor 28 in order to provide the requisite thermal treatment of the feed material. The level of carbonaceous material within the reactor can be sensed and/or monitored by a suitable level indicating device 93 mounted in the flanged connector 64 which may comprise any one of the types well known and commercially available.

The reacted product is transferred horizontally by the conveyor 86 and drops by gravity into a hopper 94 which may suitably be connected to one or a plurality of lock-hoppers for providing intermittent removal of the reaction product therefrom.

In accordance with an alternative embodiment as illustrated in FIG. 3 of the drawings, a continuous extraction of product from the reactor is effected as opposed to the intermittent removal as heretofore described in connection with FIG. 1. As shown in FIG. 3, and wherein like parts are designated by the same numeral with a prime affixed thereto, the flange 76' at the lower end of the reactor is connected to a flange 78' connected to a receiving chamber 80' forming an inlet to an extruder 96 comprising a tubular housing 98 formed with a tapered extrusion orifice 100 at the outlet end thereof. A screw-type conveyor 86' is rotatably supported within the tubular housing 98 and is drivingly coupled through a seal 90' to a variable speed electric motor 92' in a manner and for the purposes previously described. In accordance with the specific alternative arrangement illustrated in FIG. 3, the thermal reaction product entering the extruder 96 is compacted to a negligible porosity and is extruded in the form of a rod or bar, indicated in phantom at 102, which may suitably be cut into appropriate lengths for handling. The high pressure to which the reaction product is subjected during passage through the extrusion orifice produces a self-sustaining seal preventing any escape of pressure from the interior of the system.

In accordance with the arrangement as described in connection with FIGS. 1–3, particulated organic carbonaceous feed materials in a dry, moist or wet condition can be processed at pressures as low as about atmospheric to elevated pressures of 3,000 pounds per square inch, and even higher, depending on the vapor pressure of the liquid component and the structural limitations of the apparatus, and at temperatures of only several hundred degrees for the purpose of performing a drying function to temperatures as high as about 2,000° F. and higher for effecting a pyrolysis and substantially complete gasification of the feed material. The countercurrent flow of the gaseous phase generated in the reactor relative to the incoming feed material is achieved by the creation of a pressure gradient between the product outlet end of the reactor 80 and gas outlet 56.

By way of example, and with reference to the flow diagram shown in FIG. 4, a process will be described for effecting an upgrading of subbituminous coals into a useful fuel employing the apparatus shown in FIG. 1. A particulated subbituminous coal, such as lignite, for example, in an as-mined condition, is introduced into the apparatus under pressure through feed hopper 10. Typically, lignite of the type found in deposits located in the north central states of the United States, principally in North and South Dakota and Wyoming, contains from about 20% up to 40% moisture, and, accordingly, need not be preliminarily dried since water is admixed therewith for the purpose of effecting a pressurization thereof. The particulate lignite is continuously introduced into the lower end of the conveying chamber and typically is at a pressure at 1490 psi and at a temperature of about 60° F. The wet particulate lignite is conveyed upwardly and passes beyond the interface as defined by the liquid level 52, as shown in FIG. 4. Upon passage beyond the operating liquid level, a drainage of the lignitic feed material occurs and a preheating thereof is effected in response to contact with the countercurrent flow of the gaseous phase as the material is conveyed to the upper portion of the preheat zone. Typically, the pressure in the preheat zone will be 1490 psi and the temperature immediately above the liquid operating level will be about 100° F. The voids in the preheat zone are filled with a gaseous phase which adjacent to the operating liquid level are composed substantially of noncondensible gases generated in the reaction zone of the reactor or deliberately added to the system for providing a gaseous phase mixture of condensible and noncondensible gases. The noncondensible gaseous phase, as illustrated in FIG. 4, is removed through an appropriate pressure relief and flow control valve which in the specific example, is set at a pressure of 1490 psi. The gaseous phase in the region of the preheat zone adjacent to and immediately above the operating liquid level is comprised of a mixture of noncondensible gases and steam in which the partial pressure of the steam is in equilibrium with the temperature of the reactor at this specific location.

Upon further upward travel of the lignitic charge, a further preheating of the charge occurs by the condensation of the condensible steam in the countercurrent gaseous phase from the higher pressure section at the upper end of the conveying chamber to the lower pressure section adjacent to the gas discharged. The average pressure in the upper portion of the preheat zone is about 1495 psig and the composition of the gaseous phase progressively varies on moving downwardly toward the gas discharge in response to the progressive condensation of steam on the surfaces of the upwardly traveling cool feed material.

The pressure gradient required to cause the gas to flow countercurrent to the particulate flow is maintained by controlling the gas outlet pressure and the temperature at the product outlet 80. In this specific example, if the gas outlet pressure is set at 1490 psig, the temperature at the product outlet 80 must be maintained above 598° F. by controlling the quantity of quench water injected. At 598° F., the equilibrium pressure of saturated steam is 1500 psig and the differential pressure between the product outlet and the gas outlet will be 10 psi. It should be understood that the actual pressure differential in any specific instance is a function of gas flow rate and the resistance to gas flow through the particulate bed. As long as the product hopper and all adjacent surfaces are maintained above the equilibrium temperature of saturated steam at the system pressure (598° F. at 1500 psig), the differential pressure can easily be controlled.

Steam produced at the product outlet 80 will become superheated as it flows upward through the reactor and will be diluted by the noncondensible gases produced in the hot zone. These hot gases will be cooled by heat exchange with the downward flowing particulate material immediately above the hot zone. As the gas continues to flow toward the gas outlet, it becomes cooler by loss of sensible heat until at some point in the preheating zone, the temperature reaches the equilibrium temperature for saturated steam at the partial pressure of the steam in the gas stream. From this point to the gas outlet, the composition of the flowing gas will continue to change as steam is progressively condensed on the cooler incoming lignite. In this preheating region, the pressure gradient opposes the backflow of noncondensible gases, whereby a concentration gradient is maintained of noncondensible gases which approaches 100% noncondensible gases at the cool end of the preheat zone, a mixture of gas and steam in the heating zone and substantially 100% condensible gases or steam in the cooling zone of the system.

In the transfer of the preheated lignite from the upper end of the preheat zone into the upper end of the reaction zone, it is preferred to provide for some void space to enable improved control of solids flow rate into the reactor. The solids, upon entering the upper end of the reactor, are heated to a desired elevated temperature and the amount of heat input required is proportional to the heat loss through the reactor walls and that extracted from the system in the upgraded coal product and gases extracted from the system. The pressure in the reactor is about 1495 psig and the temperature is about 950° F. The gaseous phase in the reaction zone is comprised of a mixture of substantially noncondensible gases produced in combination with condensible gases in the form of superheated steam.

Upon passage downwardly of the reaction zone, the upgraded lignitic coal product is cooled by an injection of water at a pressure of 1500 psig or greater, which is controlled at a rate sufficient to maintain the pressure in the reactor at the outlet end thereof at about 1500 psig. The equilibrium temperature of the saturated steam produced in the cooling zone is 598° F. and the cooled product will be of a corresponding temperature. The cooled product is thereafter transferred through a suitable lock-hopper seal and pressurized with steam at the same pressure of 1500 psig in accordance with either of the arrangements illustrated in FIGS. 1 and 3.

It will be apparent from the foregoing that in accordance with the foregoing arrangement, a dynamic concentration gradient of the gaseous phase is provided between the hot end and cool end of the apparatus, whereby substantially all of the heat evolved is recovered through the condensation of the condensible phase, effecting a preheating of the incoming feed material.

An alternative satisfactory apparatus for thermal processing of organic carbonaceous feed materials in accordance with the present invention is illustrated in FIG. 5. As shown, the apparatus employs a conveying chamber and reaction chamber which are in axial alignment in lieu of the arrangement illustrated in FIG. 1 in which the reaction chamber 66 is disposed in a substantially upright position, relying on gravity to effect downward flow of the reaction mass therethrough. The apparatus of FIG. 5 also embodies an alternative mechanism for introducing the slurry feed into the conveying chamber and embodies a pressure-let down turbine system for recovering power from the gaseous phase withdrawn from the apparatus.

Referring now in detail to FIG. 5, the apparatus comprises a vessel or tube 104 disposed in an angularly inclined position defining at its lowermost end, a conveying chamber 106 and insulated preheat section or chamber 108 disposed intermediate the ends thereof, and a reaction section or chamber 110 extending along the upper end portion thereof. The lower inlet end of the vessel 104 is sealed by a flange 112 which is coupled to a flange 114 through a suitable seal and bearing arrangement in a manner as previously described to a gear box 116 on which a variable speed electric motor 118 is coupled in driving relationship. The output shaft of the gear box 116 is connected in rotating driving relationship to a screw-type conveyor or augar 120, which extends substantially centrally of the vessel 104 for the entire length thereof and terminates, as shown in FIG. 5, adjacent to the outlet of a discharge tube 122 coupled by means of a flange 124 to a flange 126 at the upper end of the vessel 104. In accordance with the foregoing arrangement, a positive mechanical transfer of the feed material is accomplished through the conveying zone, preheat zone and reaction zone of the apparatus. The speed of rotation of the screw conveyor 120 can be varied to achieve the desired residence time of the carbonaceous material in the reaction zone in order to obtain the requisite thermal treatment of the feed material in a manner and for the purposes as previously described in connection with the apparatus of FIG. 1.

In lieu of employing a pressurized storage chamber or lock hopper 10, as shown in FIG. 1, for introducing the feed material in the form of a slurry into the inlet end of the reactor, a reciprocating pump and ball check valve arrangement is employed which is interposed between a feed material slurry supply tank (not shown) and a slurry inlet pipe 128 disposed in communication with the lower portion of the conveying zone 106. The pump and check valve arrangement comprises a chamber 130 connected at its lower end to a slurry feed inlet conduit 132 forming a ball check seat 134 at its inner side on which an inlet ball 136 is adapted to be seated during the discharge of pressurized slurry from the chamber 130. A wall portion 138 extends transversely across the upper portion of the chamber 130 and is formed with a central port 140 defining a valve seat 142 at its upper edge on which an outlet ball 144 is adapted to be seated during the suction stroke of the pump piston. The upper end of the chamber 130 is provided with an outlet connected to a conduit 146 which in turn in connected to the slurry inlet pipe 128.

A pump cylinder 148 incorporating a reciprocating pump piston 150 is affixed to and projects laterally of the chamber 130 and is reciprocable by means of a connecting rod drivingly coupled to a suitable variable speed motor (not shown). During the inward stroke of the pump piston 150 or to the right as viewed in FIG. 5, a pressurization of the interior of the valve chamber 130 is effected, causing the outlet ball 144 to move from the position as shown in solid lines to the raised position as shown in phantom, permitting slurry to pass through the conduit 146 into the slurry inlet pipe 128 and into the conveying chamber of the apparatus. During the retracting stroke of the piston 150, or to the left as viewed in FIG. 5, the interior of the valve chamber 130 is of reduced pressure, causing the outlet ball 144 to seat as shown in solid lines in FIG. 5, while the inlet ball 136 is raised to the position as shown in solid lines, permitting entry of additional slurry feed material into the valve chamber. The ball check valve arrangement is scaled in size so as to accept particles of the carbonaceous feed material of the desired size consistent with the type of material being processed. Ordinarily, high pressure pump and ball check valve arrangements of the design as shown in FIG. 5 permit particles as large as about ¼ of the ball diameter to flow satisfactorily through the valve. The operation of the slurry pump and ball check valve arrangement is performed so as to introduce the requisite quantity of slurry into the entrance of the conveying chamber at a pressure slightly above that prevailing within the reaction system. As in the case of the reactor apparatus shown in FIG. 1, the level of liquid indicated at 152 in FIG. 5 is maintained within a preselected range in a manner as previously described and excess liquid is withdrawn from the conveying chamber through a drain conduit 154 equipped with a flow control valve 156. The inlet of the drain conduit 154 is provided with a foraminous plate or screen 158 to prevent entry of the particulated carbonaceous feed material. The liquid withdrawn can suitably be recycled to the feed material slurry storage tank for reuse.

The screw conveyor 120 effects an upward conveyance of the particulated carbonaceous feed material beyond the liquid level 152 into the preheat section 108 in which a drainage of entrained liquid and a preheating thereof occurs in a manner as previously described. The preheat zone 108 is preferably provided with a layer of insulation 160 to minimize heat loss to the surrounding atmosphere. From the upper outlet end of the preheat zone, the substantially dry heated carbonaceous feed is transferred axially by the screw conveyor into the reaction zone 110, which in the embodiment as shown in FIG. 5, is maintained at a preselected elevated temperature by means of a jacket 162 into which a preheated gas or a combustible fuel-air mixture is introduced through an inlet tube 164 and is exhausted in a countercurrent manner through a flue gas outlet tube 166. The jacket 162 is provided with appropriate insulation 168 and the supply of heated flue gas or a fuel-air gaseous mixture for combustion within the jacket itself is controlled so as to provide the desired temperature of the feed material within the reaction zone.

The thermally treated feed material, upon emergence from the upper end of the reaction zone 110, passes into the discharge tube 122 which is provided with a coupling 170 through which liquid, such as water, is introduced to effect a cooling of the reaction product in response to conversion of the liquid into a condensible gaseous phase, which travels countercurrent with the other gaseous constituent formed in the reaction zone through the preheat zone 180 and ultimately outwardly of a gas outlet 172 mounted in the conveying zone adjacent to the operating liquid level 152. The cooled reaction product passes through a spider 174 on which the upper end of the screw conveyor 120 is rotatably supported into an extruder 176 of a type similar to that described in connection with FIG. 3. The extruder 176 comprises a tubular housing 178 having a flanged upper end to which a flange 180 is connected incorporating a bearing and seal arrangement 182 for rotatably supporting and sealing the output shaft of a gear reducer 184 drivingly coupled to a variable speed electric motor 186. The gear reducer is drivingly coupled to a screw-type conveyor or auger 188 extending axially for the length of the tubular housing 178 and is supported at its lower end by means of a spider 190. The lower flanged end of the tubular housing is connected to a flange 192 defining an extrusion orifice 194 which is disposed in communication with the upper end of a collection chamber 196. The collection chamber 196 can be provided with suitable comminuting means for effecting a cutting or pelletizing of the extrudate into particles of the desired size. As in the case of the extruder shown in FIG. 3, the extruder 176 effects a compaction of the carbonaceous reaction product into a substantially dense mass which upon passage through the extrusion orifice forms a self-sustaining seal, preventing any escape of pressure from the interior of the reaction system. The speed of rotation of the screw 188 can be varied in response to the variable speed motor 186 consistent with the rate at which reaction product is fed to the tubular housing to assure the maintenance of a proper pressuretight seal in the extrusion orifice.

A further optional feature of the reactor shown in FIG. 5 comprises a power recovery system which is schematically illustrated and is encompassed by the dotted line. The gaseous phase generated in the reaction zone, as well as the condensible gases produced during the preheating and vaporization of liquid in the feed material, as well as the liquid introduced in the cooling zone through the coupling 170, passes in a countercurrent fashion, as previously described, relative to the movement of the feed material. The gaseous phase remaining which is withdrawn through the gas outlet, comprises predominantly noncondensible gases under the temperature and pressure conditions prevalent in the input end of the preheat zone, and is withdrawn through a pressure control valve 198 which is preset to maintain the appropriate pressure within the interior of the apparatus. The inlet end of the gas outlet tube 172 is provided with a suitable screen 200, such as shown in FIG. 2, for restricting entry of any particulated feed material.

The gaseous phase discharged through the flow control and pressure control valve 198 can optionally pass through a heat exchanger 202 to increase the volumetric flow of gas by adding heat from some source of waste heat such as flue gas, and thereafter passes into a pressure let-down turbine whereby a controlled adiabatic expansion and pressure reduction of the gaseous phase occurs which is accompanied by condensation of condensible gases, such as water, present in the gaseous effluent from the reactor. Preferably the turbine is of a construction which can tolerate the presence of condensibles in the gases passing therethrough, of which a turbine produced by Roto-Flow Company, which can tolerate 15% by weight condensibles, is a preferred apparatus. Typically, the first stage turbine schematically illustrated at 204 in FIG. 5, provides for a pressure let-down of from about 1,500 psi to about 300 to about 500 psi, and the condensate formed during the pressure let-down is withdrawn and removed through a conduit 206. The remaining gaseous phase is transferred to a second stage pressure let down turbine 208 in which a further adiabatic expansion of the gas is effected, such as form a pressure of about 300 to about 500 psi down to about 30 to about 50 psi in which some of the organic condensible constituents in the gas are condensed. Here again, the pressure let-down is controlled to prevent the formation of an undesirable quantity of liquid condensate consistent with the type and design of the turbine employed. The effluent from the second stage turbine 208 is transferred to a separator 210 in which the organic condensate is withdrawn through a drain conduit 212 and the noncondensible gaseous phase is withdrawn through a conduit 214 as a valuable fuel gas by-product. The first and second stage turbine can advantageously be connected to electric generating equipment for generating electrical power required for operating the process equipment and plant facilities and any excess of such electrical energy can be sold. The condensible organic phase recovered from the separator can also be advantageously employed as a liquid fuel along with the gaseous fuel constituent for providing the requisite heat in the reactor for thermally processing the carbonaceous feed material.

While it will be apparent that the invention herein disclosed is well calculated to achieve the benefits and advantages hereinabove set forth, it will be appreciated that the invention is susceptible to modification, variation and change without departing from the spirit thereof.

What is claimed is:

1. An apparatus for thermal treatment of organic carbonaceous materials under pressure comprising
   means defining a pressurized storage chamber containing a supply of particulated feed material to be processed,
   means defining a conveying chamber having a lower inlet end and an upper outlet end disposed at an elevated position relative to said inlet end,
   means for admixing said particulated feed material with a liquid, means for transferring said feed material and liquid under pressure into said inlet end of said conveying chamber, means for controlling the level of liquid in said conveying chamber at a preselected operating level intermediate of said inlet end and said outlet end thereof, means for conveying the feed material upwardly through said conveying chamber and beyond the operating level of liquid therein toward an outlet in said outlet end thereof, means for defining a reaction chamber having an inlet disposed in communication with said outlet of said conveying chamber for receiving the feed material discharged through said outlet, means for heating said reaction chamber and said feed material therein to an elevated temperature for a period of time sufficient to vaporize at least a portion of the volatile substances therein to form a gaseous phase and a reaction product;

means in said conveying chamber disposed intermediate of said operating level and said outlet for withdrawing said gaseous phase in a direction countercurrent to the flow of feed material, means for cooling said reaction product discharged from said reaction chamber, means defining a receiving chamber for receiving the cooled reaction product from said reaction chamber, and means for discharging the reaction product from said receiving chamber.

2. The apparatus as defined in claim 1, wherein said conveying chamber is angularly inclined relative to the horizontal.

3. The apparatus as defined in claim 1, in which said conveying chamber is of substantially uniform cross sectional area throughout its length.

4. The apparatus as defined in claim 1, in which said means for conveying said feed material upwardly through said conveying chamber comprises a rotary screw conveyor.

5. The apparatus as defined in claim 1, in which said means for conveying said feed material upwardly through said conveying chamber is of a variable speed.

6. The apparatus as defined in claim 1, in which said means for controlling the level of liquid in said conveying chamber at a preselected operating level includes sensing means on said conveying chamber and a flow control valve operatable in response to said sensing means for introducing and extracting liquid into and from said apparatus.

7. The apparatus as defined in claim 1, in which said reaction chamber is oriented in a substantially upright position with said inlet disposed in the upper end portion thereof.

8. The apparatus as defined in claim 1, in which said means for cooling said reaction product discharged from said reaction chamber comprises means for introducing liquid in contact with said reaction product in a manner to effect vaporization thereof into said gaseous phase for flow in a direction countercurrent to the flow of said feed material.

9. The apparatus as defined in claim 1, in which said means for discharging the reaction product from said receiving chamber comprises conveying means for transferring the reaction product under pressure from said receiving chamber.

10. The apparatus as defined in claim 1, in which said means for discharging the reaction product from said receiving chamber comprises an extrusion orifice, and means for conveying the reaction product under pressure for extrusion through said extrusion orifice in a manner to maintain the sealed integrity of said apparatus.

11. The apparatus as defined in claim 1, in which said means for cooling said reaction product and said means in said conveying chamber for withdrawing said gaseous phase in a direction countercurrent to the flow of feed material are coordinated to provide a higher pressure in the vicinity of the cooling zone promoting a countercurrent flow of the gaseous phase relative to the direction of travel of the feed material.

12. The apparatus as defined in claim 1, in which said reaction chamber is oriented in axially aligned relationship with the axis of said conveying chamber.

13. The apparatus as defined in claim 12, in which said means for conveying said feed material upwardly through said conveying chamber extends axially through said reaction chamber for effecting a controlled conveyance of the feed material therethrough.

14. The apparatus as defined in claim 13, in which said means for conveying said feed material through said conveying chamber and said reaction chamber comprises a rotary screw conveyor.

15. The apparatus as defined in claim 1, in which said means for transferring said feed material and liquid into said inlet end of said conveying chamber comprises a reciprocating piston pump incorporating inlet and outlet check valves.

16. The apparatus as defined in claim 1, in which said means in said conveying chamber for withdrawing said gaseous phase includes a pressure flow control valve for maintaining said conveyor chamber and said reaction chamber at a preselected operating pressure.

17. The apparatus as defined in claim 1, in which said means in said conveying chamber for withdrawing said gaseous phase further includes a heat exchanger for adding sensible heat to said gaseous phase from a waste heat source to increase the volumetric flow thereof.

18. The apparatus as defined in claim 1, in which said means in said conveying chamber for withdrawing said gaseous phase further includes a pressure let-dowm turbine for adiabatically expanding said gaseous phase to a preselected lower pressure and power generating means connected to said turbine.

19. The apparatus as defined in claim 18, further including means for recovering the condensible constituents in said gaseous phase discharged from said turbine.

20. A process for the thermal treatment of organic carbonaceous materials under pressure which comprises the steps of introducing a supply of particulated feed material to be processed into a storage chamber, admixing said feed material with a liquid, introducing said feed material and liquid under pressure from said storage chamber into a conveying chamber having a lower inlet end and an upper outlet end disposed at an elevated position relative to said inlet end, controlling the level of liquid in said conveying chamber at a preselected operating level intermediate of said inlet end and said outlet end thereof, conveying the feed material upwardly through said conveying chamber and beyond the operating level of liquid therein toward an outlet in said outlet end thereof, transferring the feed material from said outlet of said conveying chamber into an inlet end portion of a reaction chamber and heating said feed material therein to an elevated temperature for a period of time sufficient to vaporize at least a portion of the volatile substances therein to form a gaseous phase and a reaction product, withdrawing said gaseous phase in a direction countercurrent to the flow of feed material at a location spaced downstream from said preselected operating level of liquid in said conveying chamber, cooling said reaction product discharged from said reaction chamber, and recovering the cooled said reaction product.

21. The process as defined in claim 20, in which the step of withdrawing said gaseous phase in a direction countercurrent to the flow of feed material is performed in a manner to effect a substantially complete condensation of the condensible gases in said gaseous phase and a cooling of the noncondensible gaseous constituents to effect a preheating of the feed material.

22. The process as defined in claim 21 in which the step of effecting a substantially complete condensation of the condensible gases in said gaseous phase on the feed material further includes the dissolving of at least a portion of the carbon dioxide constituent in the gaseous phase producing an aqueous carbonic acid solution which leaches at least a portion of the alkali metals present in the feed material.

* * * * *